(12) United States Patent
Hon (10) Patent No.: US 9,309,860 B2
(45) Date of Patent: Apr. 12, 2016

(54) WAVE ENERGY CONVERSION DEVICE

(76) Inventor: Raphael Hon, Irvine, CA (US)

( * ) Notice: Subject to any disclaimer, the term of this patent is extended or adjusted under 35 U.S.C. 154(b) by 134 days.

(21) Appl. No.: 13/508,347

(22) PCT Filed: Nov. 4, 2010

(86) PCT No.: PCT/US2010/055366
§ 371 (c)(1),
(2), (4) Date: May 4, 2012

(87) PCT Pub. No.: WO2011/056919
PCT Pub. Date: May 12, 2011

(65) Prior Publication Data
US 2013/0008158 A1  Jan. 10, 2013

Related U.S. Application Data

(60) Provisional application No. 61/258,851, filed on Nov. 6, 2009.

(51) Int. Cl.
*F03B 13/18* (2006.01)
*F03B 13/12* (2006.01)
(Continued)

(52) U.S. Cl.
CPC ............. *F03B 13/1815* (2013.01); *F03B 13/12* (2013.01); *F03B 13/16* (2013.01); *F03B 13/18* (2013.01); *F03B 13/181* (2013.01); *F03B 13/1805* (2013.01); *F03B 13/20* (2013.01);
(Continued)

(58) Field of Classification Search
CPC ......... Y02E 10/38; Y02E 10/32; Y02E 10/20; F03B 13/12; F03B 13/16; F03B 13/18; F03B 13/1805; F03B 13/181; F03B 13/1815; F03B 13/20

USPC ............ 60/495–501, 504–507, 328; 417/330–333, 337; 290/53, 42, 43, 54
See application file for complete search history.

(56) References Cited

U.S. PATENT DOCUMENTS

| 322,129 A | 7/1885 | Scoville |
|---|---|---|
| 581,067 A | 4/1897 | Fletcher |

(Continued)

FOREIGN PATENT DOCUMENTS

| FR | 2334840 | 7/1977 |
|---|---|---|
| WO | WO 2006/122397 | 11/2006 |
| WO | WO 2008/009131 | 1/2008 |

OTHER PUBLICATIONS

International Search Report (ISR), PCT/US2010/055366.

*Primary Examiner* — Kenneth Bomberg
*Assistant Examiner* — Wesley Harris
(74) *Attorney, Agent, or Firm* — Laba Karki (57) ABSTRACT

Several embodiments of a device for economically harvesting wave energy are disclosed. A sealed vessel for air storage, the spar buoy, is mostly submerged under water is also used as an inertial body that surface floats move relative to. The spar buoy may take many geometrical forms, but all have a stem that is above the water surface. Piston pumps are placed at the top of the stem. The pump has a gearing reduction to optimize the rotational motion of the pump drive shaft. Small angular motion at the drive shaft results in multiple cycles of linear reciprocal motion of the piston. Various mechanisms could convert the relative motion between the floats and the spar buoy to a rotational motion of the shaft. The compressed air generated by the pump is stored in the spar buoy and regenerated as electrical energy by expanding the compressed air in a turbine.

22 Claims, 10 Drawing Sheets

(51) Int. Cl.
- *F03B 13/16* (2006.01)
- *F03B 13/20* (2006.01)
- *F03B 13/24* (2006.01)
- *B63B 35/44* (2006.01)

(52) U.S. Cl.
CPC ......... *F03B 13/24* (2013.01); *B63B 2035/4466* (2013.01); *F05B 2210/404* (2013.01); *F05B 2240/40* (2013.01); *F05B 2240/93* (2013.01); *F05B 2240/95* (2013.01); *F05B 2250/411* (2013.01); *F05B 2260/4021* (2013.01); *F05B 2260/4031* (2013.01); *Y02E 10/20* (2013.01); *Y02E 10/32* (2013.01); *Y02E 10/38* (2013.01)

(56) References Cited

U.S. PATENT DOCUMENTS

| | | | |
|---|---|---|---|
| 582,282 A | 5/1897 | Greiner | |
| 628,457 A * | 7/1899 | Gehre | 290/42 |
| 738,996 A * | 9/1903 | Hagen | 417/332 |
| 888,721 A | 5/1908 | Milbury | |
| 971,343 A | 9/1910 | Barr | |
| 1,045,654 A | 11/1912 | Willy | |
| 4,009,395 A | 2/1977 | Long et al. | |
| 4,092,828 A * | 6/1978 | Garza | 60/506 |
| 4,249,084 A * | 2/1981 | Villanueva et al. | 290/53 |
| 4,281,257 A * | 7/1981 | Testa et al. | 290/42 |
| 4,408,455 A * | 10/1983 | Montgomery | 60/505 |
| 4,768,984 A * | 9/1988 | de Oliveira et al. | 441/21 |
| 5,179,837 A * | 1/1993 | Sieber | 60/500 |
| 5,359,229 A * | 10/1994 | Youngblood | 290/53 |
| 5,701,740 A | 12/1997 | Tveter | |
| 6,269,636 B1 | 8/2001 | Hatzilakos | |
| 6,574,957 B2 * | 6/2003 | Brumfield | 60/398 |
| 7,298,054 B2 * | 11/2007 | Hirsch | 290/42 |
| 2002/0162326 A1 | 11/2002 | Brumfield | |
| 2008/0122225 A1 * | 5/2008 | Smith | 290/42 |

\* cited by examiner

WAVE ENERGY CONVERSION DEVICE

CROSS-REFERENCE TO RELATED APPLICATIONS

The present application is a U.S. National Phase Application of International Application PCT/US2010/055366, filed on Nov. 04, 2010, which claims the benefit of U.S. Provisional Application No. 61/258,851, filed on Nov. 06, 2009, all of which are herein incorporated by reference in their entirety.

FIELD OF THE INVENTION

This application relates to a wave energy conversion device through air compression.

BACKGROUND OF THE INVENTION

Renewable energy is currently a small portion of society's energy generation compared to fossil fuels energy sources. Although wave energy is a large source of renewable energy, it is an underutilized source because current methods and technologies are not economically competitive. This is due to the high cost of the current technologies or the extensive infrastructure required. In addition, the technology should not pose a threat to marine life or cause other environmental damage. Ideally, the harvested energy may also be stored for use during peak energy demand.

Most wave energy extraction devices known as point absorbers utilize wave motion to move a float relative to another float or body. Two common types of relative motion are employed. The first utilizes float motion relative to rigidly anchored bodies such as sea platforms while the other uses the relative motion of two floating bodies. The large infrastructure cost makes the former type expensive while present known methods of relative motion between two floating bodies have high unit cost. This is because most of these systems need to be designed to withstand the severe marine environment.

Many inventions harvest wave energy by placing floats in the sea and directly attach the linear (heaving) motion of the float to push or pull a piston in a hydraulic cylinder. U.S. Pat. Nos. 582,282 and 888,721 illustrate such a mechanism. Floats are connected to a rod or a lever arm that is connected to double acting cylinder on the other end. In many designs, one end is rigidly anchored to the sea bed while the other is connected to the floats. The motion of the float drives the double acting cylinder to generate energy. Many of these prior articles require a platform or infrastructure anchored to the sea floor. For large scale energy production, these structures have to be designed to withstand high loads at sea which is very costly.

Devices that directly connect the linear motion of a float to the linear motion of a piston pump will only be cost effective for pumping an incompressible fluid such as water or hydraulic fluid. Incompressible fluids are incapable of storing energy unless they are pumped to a high elevation and stored in a dam. Compressible fluids such as air can store energy in the form of pressure. However, a piston pump will not generate sufficient pressure with compressible fluids unless the piston travels a significant portion of its stroke. As ocean waves are unpredictable and irregular, the transmission of wave motion directly to a simple piston will only be efficient in a small range of wave heights. Shallow waves will not generate sufficient compression, and large waves beyond the stroke length of the cylinder are not harvested.

A method described by Leavitt in U.S. Pat. No. 322,129 converts the linear motion of the float to a rotational motion and converted back into a linear motion of a fixed stroke length using a rack and pinion gearing. Such a method would be preferable for compressing air with a piston pump. However, the Leavitt invention requires a structure that is rigidly anchored to the sea floor. In fact, numerous inventions including U.S. Pat. Nos. 738,996; 971,343; 1,045,654; 4,009,395; and 6,269,636 require the use of a platform with permanent foundation for the mechanism to work. These structures, as described earlier, would be costly to build and maintain.

Many designs utilize the relative motion between a float relative to another float or body to harvest wave energy. The relative motion between floats eliminates the need for rigid structures anchored to the sea bed. U.S. Pat. No. 581,067 illustrates such an embodiment of harvesting wave energy. Patented in 1897 by Fletcher, the invention pumps sea water to the shore, where it is used to drive a Pelton wheel to generate energy. A large plate is attached to a submerged float to increase its inertia relative to the surface float. The heaving motion of the float drives the piston in a double acting cylinder combined with one way check valves to pump sea water. As discussed previously, the Fletcher invention only works well for pumping liquid, and pumping sea water have undesirable effects for both marine life and the pump.

Other prior art references use the relative motion of floats to compress a piston pump with hydraulic fluid. The hydraulic fluid is immediately used to drive a small turbine that is typically placed within the float or the point absorber unit at sea. Other prior art references convert the undulating motion of floats to a unidirectional rotary motion using mechanisms such as ratchets or clutches. Many of these inventions that generate electrical energy at sea are inefficient and have high costs. Very few inventions are in practice or generate energy on a large scale, and even fewer are capable of storing the generated energy.

SUMMARY OF THE INVENTION

Several embodiments of a device to economically harvest wave energy are disclosed. A sealed vessel for air storage, the spar buoy, is mostly submerged under water is also used as an inertial body that surface floats move relative to. The spar buoy may take many geometrical forms, but all have a stem that is above the water surface. Piston pumps are placed at the top of the stem. The pump has a gearing reduction to optimize the rotational motion of the pump drive shaft. Small angular motion at the drive shaft results in multiple cycles of linear reciprocal motion of the piston. Various mechanisms could convert the relative motion between the floats and the spar buoy to a rotational motion of the shaft. The compressed air generated by the pump is stored in the spar buoy and regenerated as electrical energy by expanding the compressed air in a turbine.

In one embodiment, floats are connected to the piston pump drive shaft through lever arms. Float motion in response to waves causes the rotation of the lever arm. In another embodiment, the float drives a rack in a rack and pinion gearing arrangement. The pinion gear motion is coupled to the drive shaft of the pump. In another embodiment, a cable and pulley mechanism is used. The linear motion of the float pulls the cable which rotates the pulleys. The pulley rotation is connected to the pump drive shaft. In yet another embodiment, the axis of a float is connected to the pump drive shaft. The float is designed to rotate easily due to wave motion, rotating the pump drive shaft. In another embodiment, the float is used to drive the pump placed at the end of a lever arm. The lever arm motion captures the energy from the gross motion of the float while the pump at the end of the lever arm generates energy from the rotation of the floats. In any of these embodiments, the spar buoy may be oriented horizontally or combined with the vertical spar buoys. Multiple stems, pumps and floats may be attached to a single spar buoy. A combination of vertical and horizontal spar buoy orientation may be used to optimize energy harness at a given site.

The spar buoy method eliminates the need to build expensive permanent structures at sea. The simple mechanisms in these embodiments keep the equipment costs low. Direct air compression with the piston pump eliminates the need for additional components such as ratchets, clutches, or active control systems to maintain a high compression ratio of the piston pump. Additional components and electronics are not a necessity to generate energy. The irregular wave energy harvested in the form of compressed air can be stored and consumed at a constant rate upon demand. Energy can be harvested from small waves, and the amount of energy harvested is proportional to the wave height. Energy is harvested independent of direction of rotation of the pump crankshaft, i.e. on both the up or down motion of the float. Electrical energy generation may be performed at sea or on shore by transmitting the compressed air to shore through pipelines similarly used for natural gas transport. Alternatively each spar buoy have an electrical generator for producing electricity from the compressed air. Also, a central station comprising at least one electrical generator could be used for producing electricity at sea or another location.

BRIEF DESCRIPTION OF THE DRAWINGS

In order to facilitate a fuller understanding of the present invention, reference is now made to the accompanying figures. These figures should not be construed as limiting the scope of the present disclosure, but are intended to be exemplary only.

FIG. 1-A shows the components of the pump unit and the float in the first embodiment.

FIG. 1-B shows the cross sectional view of the section A-A of FIG. 1-A.

FIG. 4-A shows the cross sectional view B-B of the fourth embodiment.

FIG. 4-B shows the possible float shapes used in the fourth embodiment.

DRAWINGS—REFERENCE NUMERALS

Figure 1:
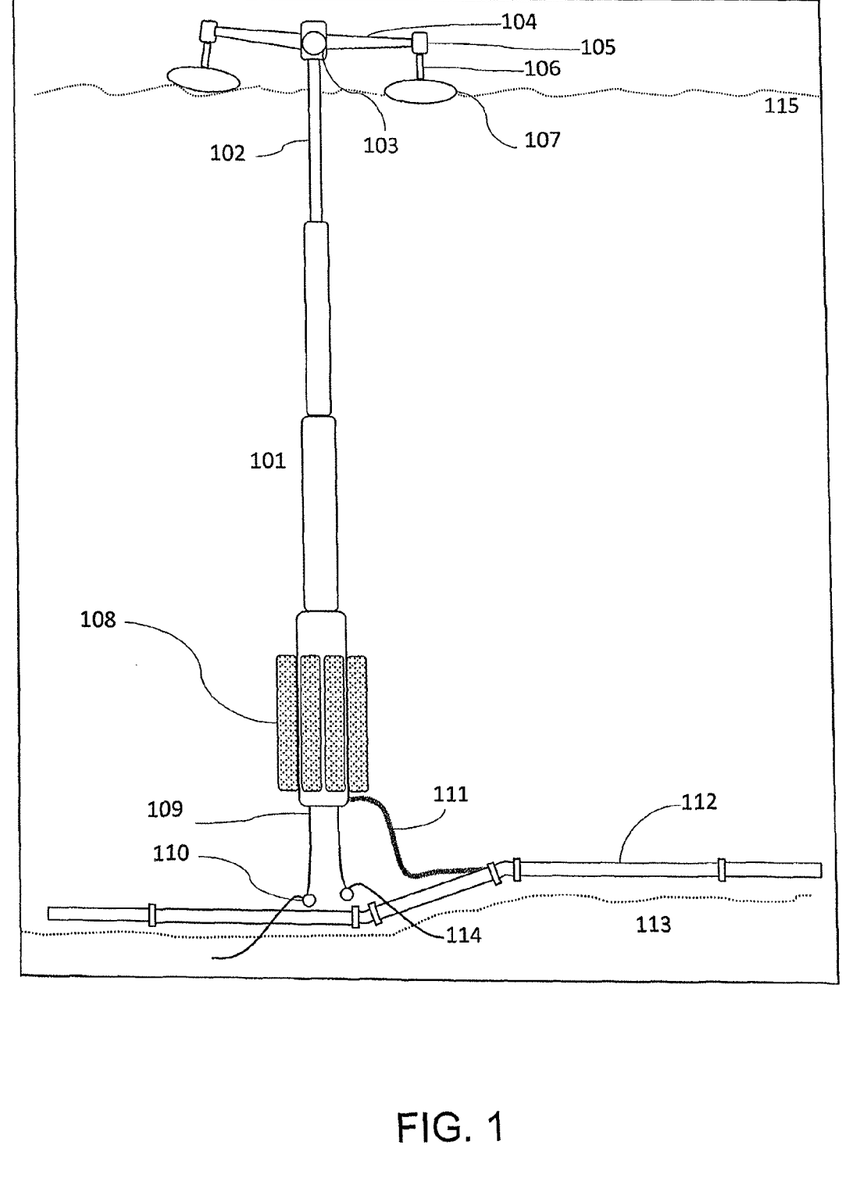
FIG. 1 shows an overall diagram of the main components of first embodiment.
Figure 2:
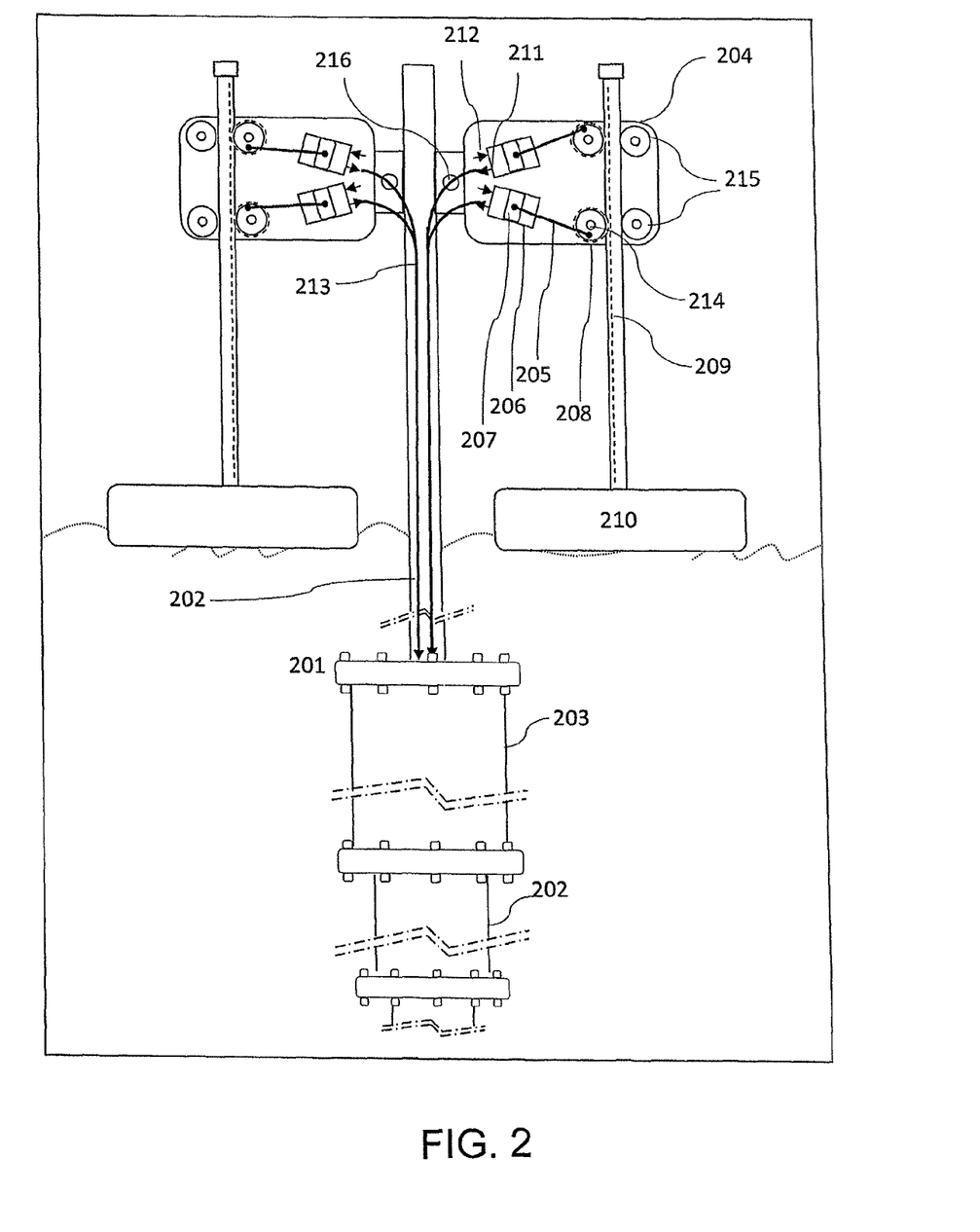
FIG. 2 shows the components of the pump and float in the second embodiment.
Figure 3:
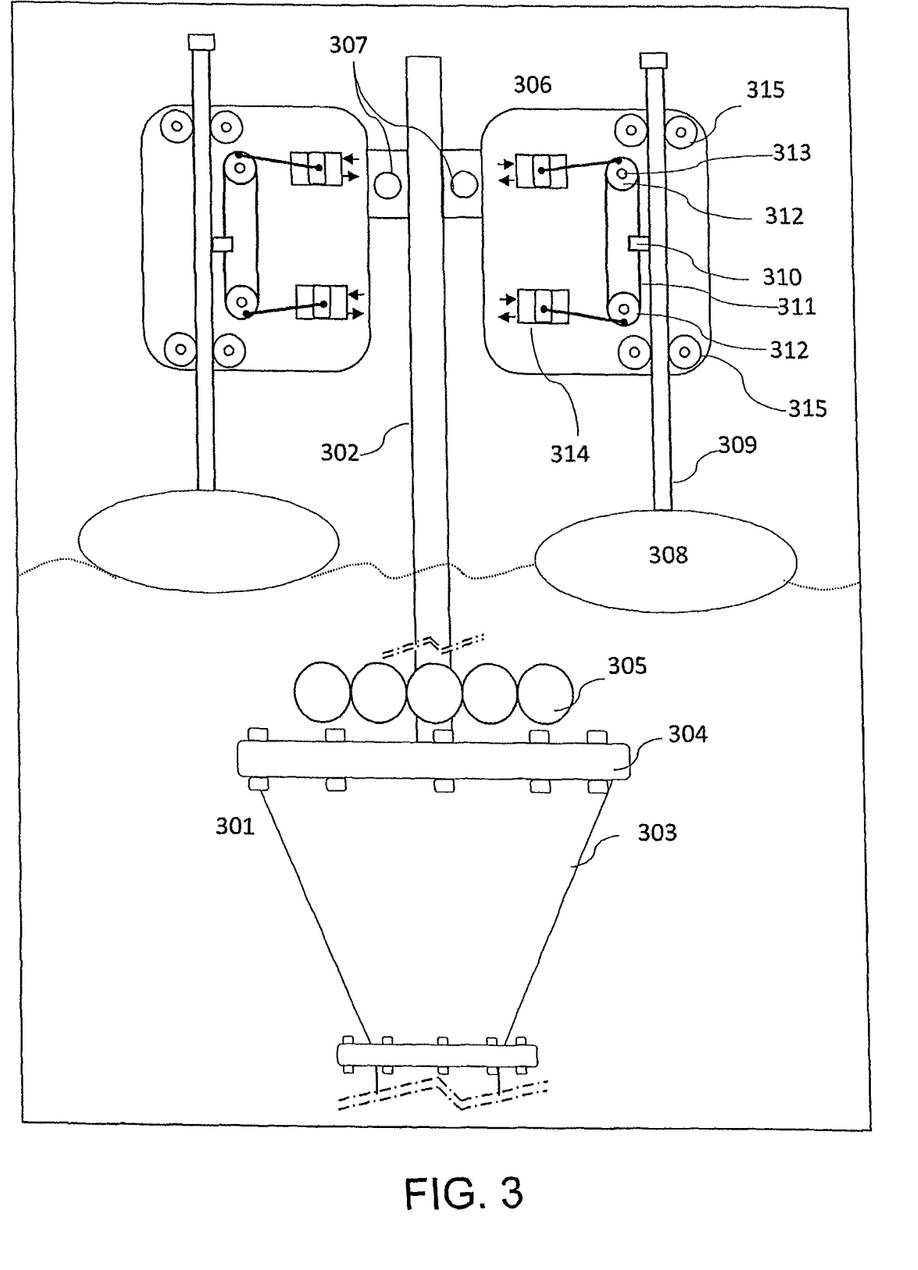
FIG. 3 shows the components of the pump and float in the third embodiment.
Figure 4:
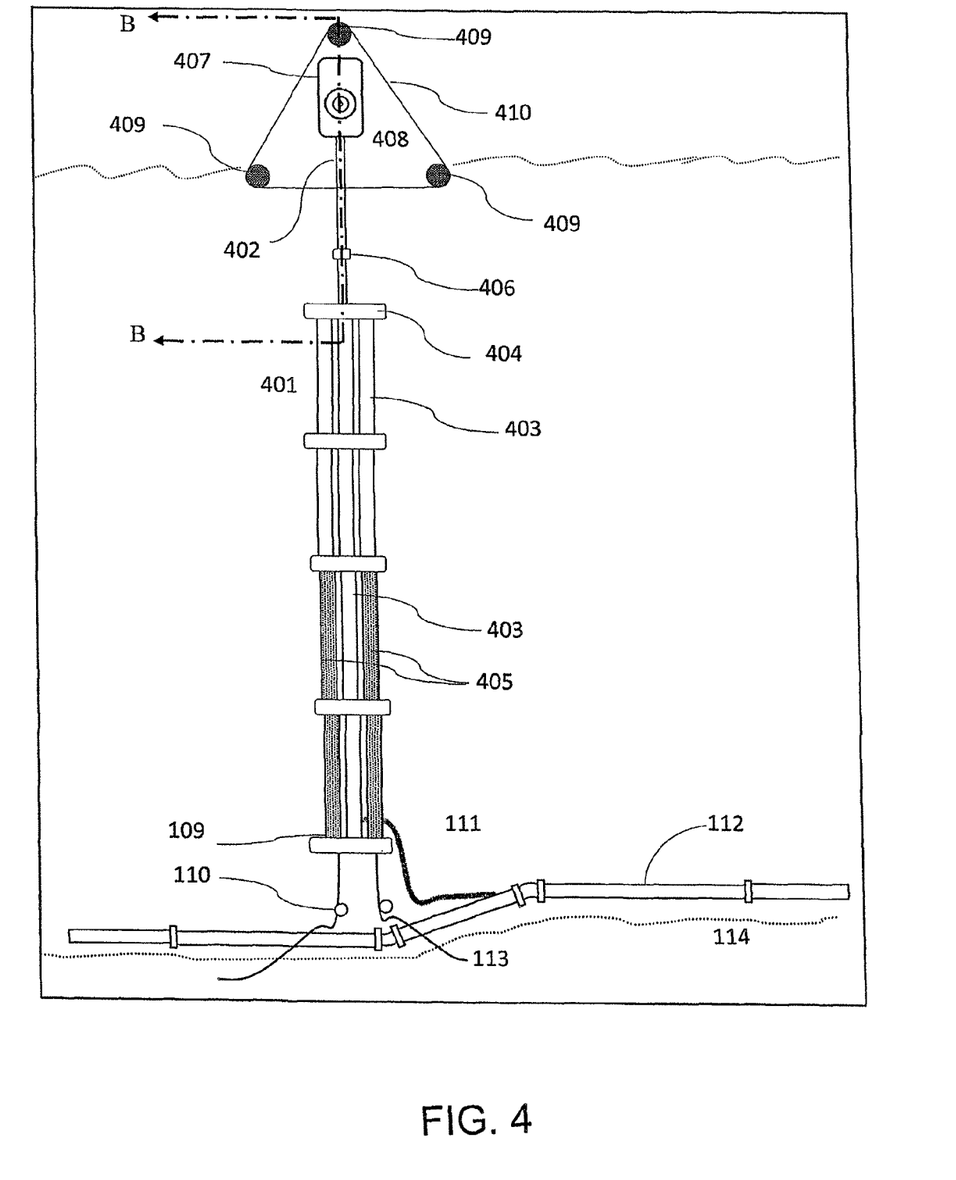
FIG. 4 shows of the main components of the fourth embodiment.

| FIG. 1 | |
| --- | --- |
| 101 | Spar buoy |
| 102 | Stem |
| 103 | Pump unit |
| 104 | Lever arm |
| 105 | Secondary pump unit |
| 106 | Vertical lever arm |
| 107 | Float |
| 108 | Spar buoy weights |
| 109 | Mooring chain |
| 110 | Anchor buoy |
| 111 | Pipeline hose |
| 112 | Submarine pipeline |
| 113 | Sea floor |
| 114 | Anchor point |
| 115 | Sea surface |
| FIG. 1-A | |
| 121 | Drive gear |
| 122 | Drive gear shaft |
| 123 | Pinion gear |
| 124 | Crankshaft |
| 125 | Piston rod |
| 126 | Compression cylinder |
| 127 | Piston |
| 128 | Check valve, inflow |
| 129 | Check valve, outflow |
| 130 | Air filter |
| 131 | Air duct |
| 132 | High pressure air line |
| 133 | Cooling fins |
| 134 | Spar buoy flange |
| 135 | Pipe (spar buoy) |
| FIG. 2 | |
| 201 | Spar buoy (decreasing diameter embodiment) |
| 202 | Stem |
| 203 | Spar buoy pipe |
| 204 | Pump unit |
| 205 | Piston Rod |
| 206 | Compression cylinder |
| 207 | Piston |
| 208 | Pinion gear |
| 209 | Float column |
| 210 | Float |
| 211 | Check valve (outflow) |
| 212 | Check valve (inflow) |
| 213 | High pressure air line |
| 214 | Crankshaft |
| 215 | Roller |
| 216 | Pin Joint |
| FIG. 3 | |
| 301 | Spar buoy (tapering embodiment) |
| 302 | Stem |
| 303 | Tapering spar buoy pipe |
| 304 | Flange |
| 305 | Submerged buoy |
| 306 | Pump unit |
| 307 | Pin joint |
| 308 | Float |
| 309 | Float column |
| 310 | Cable Connector |
| 311 | Cable |
| 312 | Pulley |
| 313 | Crankshaft |
| 314 | Pump |
| 315 | Roller |
| FIG. 4 | |
| 401 | Spar buoy (parallel pipe embodiment) |
| 402 | Stem |
| 403 | Spar buoy pipe |
| 404 | Flange |
| 405 | Weighted column |
| 406 | Horizontal beam |
| 407 | Pump unit |

Figure 5:
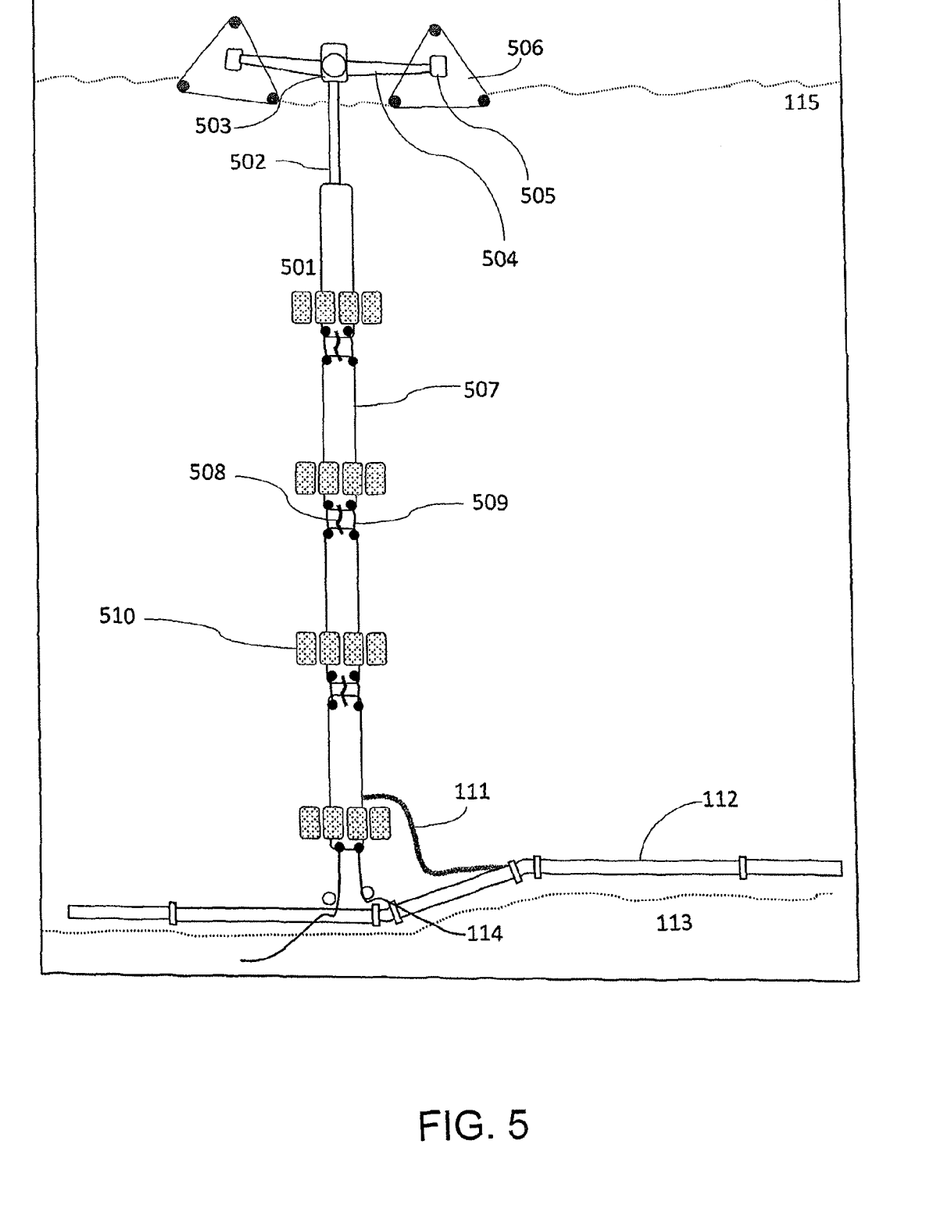
FIG. 5 shows the overall diagram of the fifth embodiment.
Figure 6:
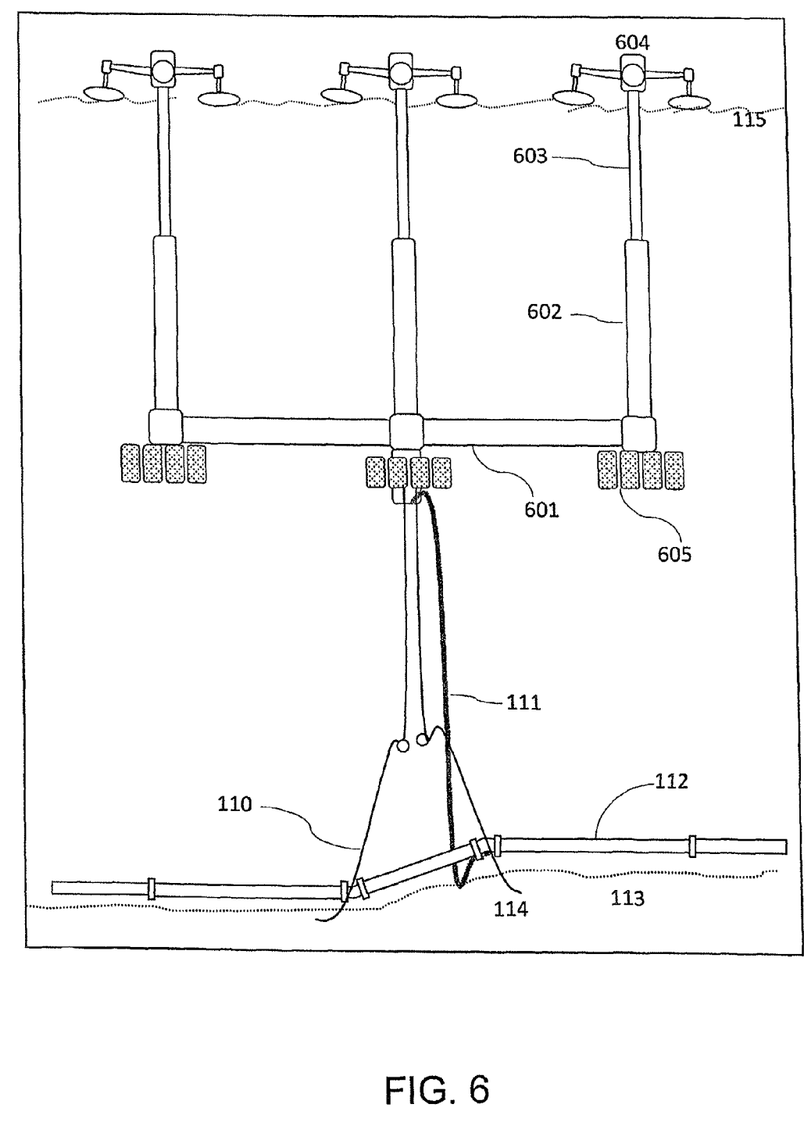
FIG. 6 shows the overall diagram of the sixth embodiment.

| | | |
|---|---|---|
| 408 | Unstable float | |
| 409 | Spar buoy weight | |
| 410 | Float wall | |
| | FIG. 4-A | |
| 411 | Float axis | |
| | FIG. 4-B | |
| 421 | Axis of rotation symbol | |
| 422 | Center of gravity symbol | |
| 423 | Center of buoyancy symbol | |
| 424 | Float weighting element | |
| 425 | Triangular shaped float | |
| 426 | Rectangular shaped float | |
| 427 | Trapezoidal shaped float | |
| 428 | Pentagonal shaped float | |
| 429 | Hexagonal shaped float | |
| 430 | Triangular-weighted hexagonal float | |
| 431 | Parallelogram shaped float | |
| | FIG. 5 | |
| 501 | Spar buoy (multiple section embodiment) | |
| 502 | Stem | |
| 503 | Pump unit | |
| 504 | Lever arm | |
| 505 | Secondary pump unit | |
| 506 | Unstable float | |
| 507 | Pipe section | |
| 508 | Flexible hose | |
| 509 | Chain | |
| 510 | Spar buoy weight | |
| | FIG. 6 | |
| 601 | Horizontal spar buoy | |
| 602 | Vertical spar buoy | |
| 603 | Stem | |
| 604 | Float and pump unit | |
| 605 | Spar buoy weight | |

DETAILED DESCRIPTION OF THE INVENTION

The main components of a first embodiment are shown in FIG. 1. An elongated hollow vessel, the spar buoy 101, is submerged in the sea with only a smaller tubular beam, the stem 102, protruding through the sea surface. At the top of the stem 102 is an air pump unit 103. A lever arm 104 connected to the drive shaft of the pump unit 103 is rigidly attached to another similar pump unit 105. Similar to lever arm 104, vertical lever arm 106 extends from pump unit 105 is rigidly attached a float 107. The spar buoy 101 is secured with optional weights 108. The mooring chain 109 connected to the body 101 at the deep end secures the entire device. A pipeline hose 111 connects the spar buoy 101 to a submarine pipeline 112. The other end of the chain 109 is secured to the sea bed 113 at a suitable anchoring location 114. Wave motion causes the floats to drive the air pumps to generate compressed air. The compressed air, or other fluid, is returned to the spar buoy 101 for storage and transported to shore through the pipeline 112. Energy is generated from the compressed air on shore using a turbine or other known methods.

In a first embodiment shown in FIG. 1, the spar buoy 101 is a long, hollow, tubular vessel that is designed to be submerged in an approximate vertical orientation in the sea. In this embodiment, the shape of the spar buoy 101 and stem 102 is similar to a hydrometer. The spar buoy 101 may be of any length, extending from the sea surface 115 to the sea floor or to the submarine pipeline 112 at any depth. Although anchored, the spar buoy is allowed to have mobility to the extent allowed by the mooring chain 109. The optional submerged anchor buoy 110 is to allow for the freedom of movement of the spar buoy 101 and chain 109. Other known mooring methods may also be employed so that the spar buoy 101 is anchored but operational at all water depths due to tidal changes. Due to the mobility of the spar buoy 101, a flexible pipeline hose 111 allows for fluidic connection between the spar buoy 101 and an optional pipeline 112.

The stem 102 is a slender beam tubular beam that extends from the spar buoy 101 such that the top end of the stem 102 stays above the water level. The diameter of stem 102 is small in comparison to the diameters or widths of the spar buoy 101 and floats 107. Since buoyancy is only dependent on the volume of water displaced by a spar buoy, the stem will have a negligible contribution to the interacting forces between the spar buoy 101 and floats 107. The length of stem 102 allows the spar buoy 101 to remain submerged for most wave conditions expected. The pump unit 103 is rigidly attached to the top of the stem 102. The stem 102 may be hollow to allow for air lines and other conduits to be connected between the pump unit 103 and the spar buoy 101.

FIG. 1-A illustrates the principles of operation of the pump unit 103 for one lever arm but applies to both levers shown in FIG. 1. Within the casing of the pump unit 103, a drive gear 121 is secured to a drive gear shaft 122 that extends out of the casing to connect to the lever arm 104. The other end of lever arm 104 is rigidly attached to a secondary pump unit 105, which is identical in function to the pump unit 103. The vertical lever arm 106 that extends from pump unit 103 is directed vertically to the float 107. The overall rise and fall of the float 107 causes a rotational motion of the drive gear 121 within pump unit 103, while the lateral motion of the float rotates the equivalent gear in pump unit 105. Except for the specific placements of the pumps and the orientation of the respective lever arms, the description of pump unit 103 applies to pump unit 105.

Pump unit 105 serves to harvest additional energy from the lateral motion of the floats. As waves tend to generate a sinusoidal surface, the float would tend to move such that it is normal to the free surface of the sea. The vector of the force on the float can be broken into two components, a sideward motion and a net vertical motion. Utilizing two pumps and lever arms, the surface wave energy is broken down into two orthogonal motions and captured by the respective pump units 103 and 105. Pump unit 105 may be omitted without the loss of function by connecting the lever arm 104 directly to float 107. Float 107 may take any shape that optimizes the performance of the entire unit as well as have optional fins. The floats 107 may be strengthened with internal spars or other methods known in the art.

A smaller pinion gear 123 is engaged to drive gear 121 such that the rotation of gear 121 rotates the smaller pinion gear 123. The pinion gear 123 rotates with crankshaft 124 which is connected to the piston rod 125, compression cylinder 126, and piston 127 assembly. The cylinder 126 is held rigidly in place with the pump casing. The rotation of the pinion gear causes the piston 127 to move up and down within the cylinder 126. At suitable locations, check valve 128 allows the piston to only draw ambient air during the intake stroke and check valve 129 allow only sufficiently pressurized air to exit the cylinder. The piston pump comprising of the piston, cylinder, and check valves is a known method for air compression. The direct coupling of arm 104 to drive gear 121 to pinion gear 123 is more efficient than other inventions that use ratchets, clutches, or other intermediary mechanisms. FIG. 1-B shows the section view AA of FIG. 1-A, showing only the gears and pumps and omitting the other components for clarity. While FIG. 1-B shows two pistons and cylinders, any quantity of pistons and cylinders may be used with any combination of phase angles between each piston. The size of piston pumps within the respective pump units 103 and 105 may be differently sized to maximize energy absorption.

Any appropriate type of gear, such as spur, helical, or bevel, may be used for gears 121 and 123. Pinion gear 123 is sized such that a small rotation of drive gear 121 is converted into one full rotation at the pinion gear. Although only one gear set is shown, multiple gear reduction sets may be used. For example, if a wave causes a float displacement 0.20 m results in a full rotation of pinion gear 123, then a 1 m wave will result in 5 rotations of pinion gear 123. Consequently, a single piston attached to crankshaft 124 will generate 5 compression strokes of piston 127. If multiple pistons are used in this example, each piston placed at different phase angles on the crankshaft 124, a full rotation for each piston is achieved at every 0.2 m displacement of the float. Such an arrangement will result in a constant load at the gears. As a result of this gearing method, the amount of energy harvested is proportional to the wave heights. This method compresses air whether the float moves up or down. It is only rotation of pinion gear 123 that is needed. The direction of rotation does not matter as each rotation of pinion gear 123 translates to one cycle of air compression. Incomplete rotations will result in partial strokes of the piston 127, and not generate sufficient pressure to open the check valve 129.

While it may seem desirable to increase the gearing ratio of gears 121 and 123, excessive gearing ratios will require very large torque to be generated by the lever arm 104. Larger torque will require a larger float and a longer lever arm 104. As a result, larger wave swells will be required to move the float for the same amount of angular rotation of lever arm 104. Since larger waves occur less frequently, practical designs will require a compromise of the gearing ratio and the lever arm length.

Except for the air intake port, the pump unit may be sealed to allow for the gears and other components to be lubricated to increase mechanical efficiency. Referring to FIG. 1-A, the interior of the pump unit 103 is sealed from sea water exposure through the drive gear shaft 122 by the use of O-rings or other known sealing mechanisms. The air intake conduit may be oriented vertically and flowing upward to minimize water intake to the air pump. Air is drawn in at the intake port through filter 130 before travelling in sealed air duct 131 to the check valve 128. The compressed air exiting the cylinder 126 and check valve 129 is routed to the high pressure air line 132. Cooling fins 133 may be placed along line 132 or on cylinder 126 to cool the compressed air before travelling to the spar buoy 101. The high pressure air from pump unit 105 is directed back to the stem through the lever arm. The air line between the moving parts of lever arm 104 and the pump units 103 and 105 are connected using flexible conduits, a rotating manifold, or other known methods. The connection for the high pressure line 132 may terminate at the spar buoy flange 134.

The spar buoy 101 can have a variety of geometries. It may consist of a single or several sections of pipes 135. The cross sections of the pipes 135 may be round or rectangular or other common shapes. The spar buoy 101 may be less buoyant than water or have approximately the same buoyancy. The main functions of the spar buoy 101 are to be a sealed storage vessel for compressed air and an inertial spar buoy that enable relative motion to floats 107. Spar buoys may be of any length, and long spar buoys also function as a conduit for transporting air to the depth of the submarine pipeline. Although shown as increasing with sea depth in FIG. 1, the diameters may be constant or decreasing with sea depth as well. The pipes 135 may have constant a constant taper or incremental diameter change, similar to a telescope shape shown in FIG. 1. To minimize costs, the spar buoy 101 may be constructed from standard industrial pipes connected together with flanges 134. Multiple pipes of the same diameter may also be placed in parallel orientation with an appropriate flange to maintain fluidic connection. The flanges 134 may be specially designed to allow for some motion between the pipes 135 to minimize stresses while maintaining fluidic connection.

A plurality of pipe sections may also be connected with flexible elements such as chains or cables and flexible hoses to form the spar buoy 101. Each pipe section may be neutrally buoyant individually and weighted to maintain a vertical orientation. Successive pipe sections are connected from the sea surface to the mooring chain or the main weight element nearest to the sea floor. Spars and ribs may be secured to the inside of pipes 135 for additional structural strength. Other known strengthening elements such as beams and trusses may be secured to the exterior of the spar buoy 101 so that it can withstand turbulent sea conditions or ocean currents. At any part of flanges 134 and pipes 135, check valves may be placed in multiple locations such that one damaged or leaking pipe 135 do not render the entire spar buoy 101 inoperable.

The increasing diameters of the pipes 135 or the parallel arrangement of pipes have the two purposes: increasing the volume for air storage and slow the response of spar buoy 101 to the wave. The increased diameter of pipes 135 increase the surface area resulting in increased drag force. A larger diameter of pipe 135 also increases the mass of the spar buoy 101. The large drag force and inertia of the spar buoy 101 in comparison to the float 107 allows for relative motion between them. The increased diameters of pipe 135 act similarly to a heaving plate of other inventions while serving the additional function of air storage. The weights 108 may be attached to the deep submerged end of the spar buoy 101 to achieve neutral buoyancy, maintain the vertical orientation, and provide stability to the spar buoy 101. The weights 108 may be of any shape and size to enhance the function of the spar buoy 101, or integrated to the shape, thickness and material composition of pipe 135. The weights 108 may also be heavy columns attached in a parallel orientation around the spar buoy 101. The parallel arrangement of weights to the spar buoy 101 also increases the cross sectional and total surface area, acting in a similar manner of a heaving plate as well. The spar buoy length under water also acts as inertia to the torque generated by the float and the lever arm through the gears.

Another added advantage of an elongated spar buoy 101 is that if it experiences induced motion due to sea currents or other causes, the relative motion with the floats will generate energy as well. Any oscillatory motion of the spar buoy 101 floating in the sea would allow for energy harvest even when there is insufficient wave energy. The spar buoy 101 may be also be designed to the need pump float 107 for its neutral buoyancy. Overall neutral buoyancy of the spar buoy 101 may be achieved merely by the volume of the spar buoy 101 or by using additional submerged buoys or auxiliary floats. Auxiliary floats may be used to maintain the vertical orientation and neutral buoyancy of the spar buoy 101. Besides floats, the spar buoy 101 may be fitted with fins or flaps that maintain the orientation of the structures. Similar to a wing shape that provides net lift for airplanes, these fins or flaps may be used to generate a net downward force on the spar buoy 101 as the float moves upwards due to an oncoming wave.

Although FIG. 1-A only shows one extension arm and float, it is understood that multiple combinations of floats and lever arms may be connected to a single pump. The lever arms and floats on each side of the spar buoy 101 illustrated in FIG. 1 drive separate gears and cylinders within a single air pump unit 103 to allow for independent motion of the two floats. Using the same principles described for the air pump unit 103, additional pumps may be set up on the stem to harness energy from the other axis of motion. For example, an additional pump may be placed on stem 102 to capture the rotational motion of pump 103 and arms 104 around the axis of the stem 102.

The lever arm and float may also be designed to be retracted off the water during severe storms. The lever arm may be designed with pin joints or other hinge connections to allow for folding the lever arm. Mechanisms that allow sliding motion of the lever arms may also be incorporated on the lever arm to allow for length change. The air compression may be staged, where compressed air exiting a cylinder may be fed to another cylinder for additional compression, and continued as needed. Alternately, high pressure air from one spar buoy 101 may be fed to the air pump of other spar buoys as compression stages. This is done to more efficiently generate higher pressure compressed air than can be achieved with a single compression stage alone. Further, the piston and cylinder compression may be performed by a double acting cylinder. The linear motion generated by the piston can be converted using known linkages to drive the linear motion of the double acting cylinder from the crankshaft. Other known mechanisms to convert the rotary motion at the crankshaft to linear motion may be employed to act on the double acting cylinder.

The multiple spar buoy 101 geometries described in this embodiment are illustrated in the drawings of the following embodiments. In the following embodiments, unless specified, the same mooring method and submarine pipeline are employed. Generation of electrical energy may be performed at sea to eliminate the need for pipelines. Compressed air may be combined from multiple buoys to one turbine. Turbines and generators may be placed in each spar buoy or housed in a special spar buoy, on a platform, an island, or a modified sea vessel. Placement of the electrical energy generation in modified sea vessels may allow for these more expensive components to be transported to safety during severe weather. Electrical energy may be returned to shore using submarine cables.

In a second embodiment, the features and the function of the spar buoy 201 and stem 202 are the same as the first embodiment and may take any one of said geometries. FIG. 2 illustrates an alternate diameter arrangement of the spar buoy 201 where the diameters of the spar buoy pipe 203 incrementally decrease with depth. The weights, mooring, and connection to submarine pipeline are the same as described in the first embodiment. The stem 202 extends out of the water surface, where the pump unit 204 is attached near the top. In this embodiment, the motion of the floats is connected to the pump through a rack and pinion gearing. The pump unit 204 in the second embodiment has many similar components to the first embodiment. The piston rod 205, compression cylinder 206, and piston 207 for air compression are driven by the motion of the pinion gear 208. The rack gearing is attached or part of the float column 209 which is connected to the float 210. The check valves 211 and 212 are represented symbolically, illustrating the function that air flow direction during the compression cycle, as described in the first embodiment. For diagram clarity are the air filter or cooling fins are not shown in FIG. 2. As in the first embodiment, the high pressure air line 213 travels back to the stem for storage in spar buoy 201.

The primary difference of the second embodiment with the first is that large drive gear in the first embodiment is replaced by the float column 209 with rack gearing that engage the pinion gear 208. The motion of the float drives the rack to rotate the pinion gears 208 and crankshaft 214 to drive the piston pump. The rack motion is held with rollers 215 to maintain engagement of the pinion and rack gearing. Two piston pumps per pump unit 204 are shown in FIG. 2, but any number and arrangement of piston pumps may be used. For example, racks may have gear tooth opposite sides, and cylinders may be placed on each side of the rack, and multiple pinion gears may be placed on a single rack. The entire rack and float is allowed to travel the range of the rack gearing. Springs may be attached near the ends of the float column 209 to prevent collision of the float to the pump unit 204.

Wave energy harvest is enhanced by the use of a pin joint at 216. This allows the pump unit 204 and float 210 to rotate as a unit relative to the stem 202 in response to wave motion. As the net force of the surface wave is constantly changing direction, allowing the float and pump to turn to the direction of the maximum force transmitted maximizes the energy harvested. Pin joint 216 also allows for the lateral motion of float to generate energy. The amount of rotation allowed may be limited to protect the float from colliding with the stem or any excessive movements. As in the first embodiment, the float may be of any shape and size. The float may feature underwater fins to capture energy from currents which result in lateral motion of the floats. Flexible hoses, conduits or rotating manifolds may be used to connect high pressure air generated in the pump to the stem.

In a third embodiment, the features and the function of the spar buoy 301 and stem 302 are the same as the first embodiment and may take any one of said geometries. FIG. 3 illustrates a tapering spar buoy 301 such that the diameter of spar buoy pipe 303 decreases with water depth. Such a design may slow the spar buoy 301 movement in the upward direction and ease the downward motion. The reverse effect may be achieved by decreasing the diameter with depth. Near the sea surface, FIG. 3 shows the stem 302 is secured with submerged buoys 305, an optional feature of the spar buoy 301 as described in the first embodiment to maintain neutral buoyancy and vertical orientation. Pump units 306 are connected to the top of the stem through a pin joint connection 307. The motion of the float 308 acts to push a float column 309 that drives the air pump unit 306, similar to the second embodiment. Where the second embodiment uses a rack and pinion gearing to convert the linear float motion to a rotary motion, the third embodiment uses a cable and pulley system.

The float column 309 has a cable connector 310 to attach a cable 311. Cable 311 loops around two pulleys 312 at the top and bottom of the pump unit 306, as shown in FIG. 3. The pulley is secured and rotates with crankshaft 313, which in turn is connected to the piston pump assembly 314, consisting of the rod, piston, cylinder and check valves. The function of pump 314 is as described in the first embodiment, generating compressed air due to the rotation of crankshaft 313. The cable connection is in sufficient tension such that the movement of the float column 309 due to the float causes the cable to move in unison, and rotating the pulleys. The rotation of the pulleys results in air compression at the piston pumps. As in the first embodiment, the direction of the pulley rotation is irrelevant, and with appropriate sizing of the pulley 312, small linear vertical motions of the float is converted to full rotations of the pulley. The rotation of pulley 312 may also be geared so that one rotation of the pulley results in multiple rotations of the crankshaft 313 driving the pump 314.

Cable 311 and pulley 312 may be replaced with a chain and sprocket to achieve the similar effect. Another alternative to the cable and pulley may be flexible belts with gearing teeth on the inner side of the belt that engage the pulley, similar to timing belts. The float column 309 in this embodiment may be configured to be shorter than the second embodiment while protecting the gearing elements from the exterior weather elements. Similar to the second embodiment, rollers 315 are used in the pump unit 306 to allow for smooth travel of the float column 309.

In a fourth embodiment, the function of spar buoy 401 and stem 402 is as described in the first embodiment, and may take any of the possible said geometries. FIG. 4 illustrates an overview of the design utilizing an alternate arrangement as described in the first embodiment where multiple spar buoy pipes 403 are placed in a parallel arrangement in between flanges 404. Near the sea floor, weighted columns 405 may be used in place of the pipes. In addition to being weights for stability and vertical orientation as described in the first embodiment, these weighted columns 405 may provide structural strength to the entire spar buoy 401.

FIG. 4-A shows the side view of section B-B of FIG. 4. In the embodiment shown, a beam extending vertically from the spar buoy 401 is attached to the middle of a horizontal beam 406. Two vertical stems 402 extend from the ends of the horizontal beam. Pump units 407 are attached at the top of each stem 402. The pump unit 407 utilizes the same components and operates in the same principle as in the first embodiment, which is to generate compressed air through the rotation of the drive gear. The placement and orientation of the drive and pinion gears and the air compression cylinder are modified from the first embodiment to suit this application. The shaft from the drive gear extends out from the pump unit 407 is rigidly connected to the axis of float 408. Weights 409 are secured at the corners of the float 408. The float wall 410 is made to have sufficient strength and rigidity to support the weights 409 and allow for rotational motion of the whole float 408, as shown in FIG. 4.

Although FIG. 4-A shows two pump units 407, one attached to each end of the float axis 411, only one pump 407 for each axis 411 may be employed. Wave motion causes the float 408 to rotate on axis 411 relative to the stem 402. This rotation generates the rotation at the pinion gear and the piston shaft resulting in compressed air generation at the pump 407. Similar to the first embodiment, due to the gearing ratio between the drive gear and the pinion gear, small motion of the float will result in multiple rotations of the air compression cylinder. The float motion may be a small swaying motion like a pendulum or larger rotations which generates even more rotation of the pinion gear and therefore more compression cycles. As in the first embodiment, the direction of rotation is irrelevant to the generation of compressed air.

Floats may have several embodiments and stability features. Water vessels such as boats and ships are designed to stay afloat and remain stable. Stability ensures that if a boat is suddenly rolled or tilted in one direction, the boat will naturally generate a restoring force to return to its original orientation, as opposed to continue tilting over until it capsizes. This is done with a combination of the hull shape and weight distribution of vessel, such that the center of gravity of the boat is below the center of lift due to buoyancy. When the center of gravity is above the center of lift, such a vessel is considered unstable. In vessels with higher center of gravities than center of buoyancy, a sudden tilt in one direction will generate additional moment or tilting force in the direction of tilt and cause the vessel to continue to tilt even further.

While this instability is undesirable for water vessels, it may be desirable for the float in this application to have a high center of gravity than a center of buoyancy so that the float rotates easily. The rotation of the float turns the drive shaft and generates compressed air. It may be possible to design the floats to be easily rotated at wave heights that are most common at the site where the point absorber is placed. FIG. 4 shows the cross section of float is shown to be triangular in shape with straight walls and weight elements 409 attached in the corners. However, the float wall 410 may be round, elliptical, or have a multiple combination of curves, similar to the shape of the hull of a ship. Any combination of shape and weight distribution may be used such that the float is easily rotated. Wave motion causes the float rotation around the axis, and the instability may amplify the rotation.

Figure 4B:
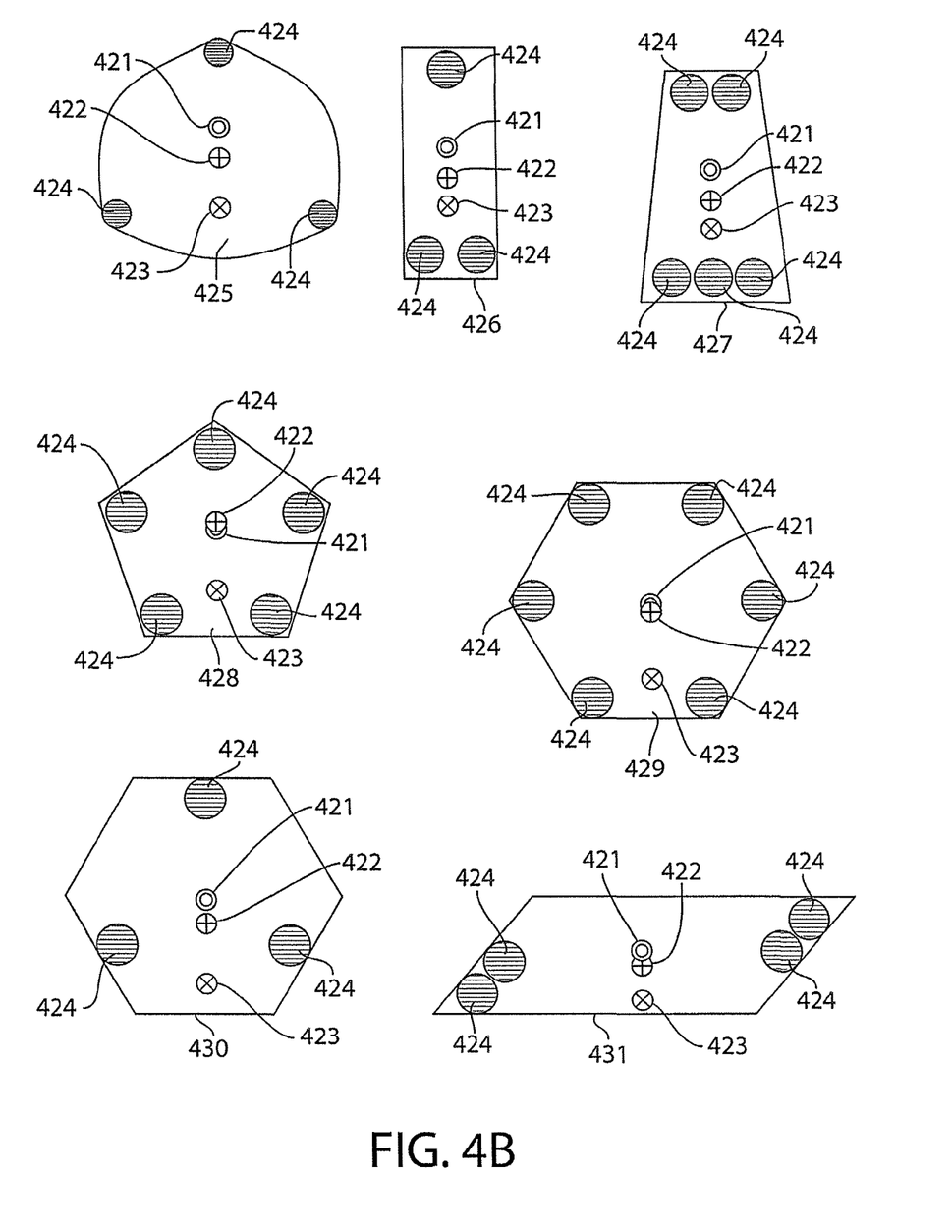

Many float shapes are possible. Other applicable float shapes with weight combinations are shown in FIG. 4-B. Symbols 421, 422, and 423 represent the axis of rotation of the float, the center of gravity, and center of buoyancy respectively for each float shape illustrated. Weight elements 424, of any shape and size are placed at specific locations on the respective float shapes to create the instability condition. Similar to the triangular float in FIG. 4, a three cornered float 425 with curved walls is shown in FIG. 4-B as a guide for the other float shapes illustrated. FIG. 4-B shows the rectangular 426, trapezoidal 427, pentagonal 428, or hexagonal 429 shaped floats. A triangular-weighted hexagonal float 430 is similar to float 425 from a weight distribution, but has a different float shape. It can be seen from floats 425 and 430 that many other float shapes, for example pentagonal or circular shapes may be used with this triangular weight distribution. The center of gravity may be above, below, or coincide with the axis of rotation. The axis of rotation may or may not be located on the geometrical center of the float shape. The center of buoyancy is dependent on the shape and orientation of the float. It may also be possible to have non symmetrical float shapes such as the parallelogram shaped float 431.

The stability of a given float design may favor just one orientation. In the float embodiments 426 and 427, placements of more weights or heavier elements at the bottom of the float, will cause the float to normally stay in that orientation. If the size of the perturbing wave is sufficiently large, the float may rotate 180 degrees to be inverted topside down, but a smaller wave would easily push the float back to the preferred orientation. The nature of the float motion may also interact with the spar buoy 401 such that the float motion induces the spar buoy motion. For example, the float may tilt over, generating additional buoyancy such that there is a net lifting of the spar buoy 401. As the spar buoy 401 rises, the tilted float may revert back to its preferred orientation. As long as the motion induces rotation of the float, energy is captured.

The weight elements may be placed inside or outside the float. The weight may be rigidly connected to the float at a distance away. For ease of transport and installation, weight elements on the float could be containers that are filled with water and sealed during deployment. For strength considerations, the float can be strengthened with internal ribs or spars and other known structural strengthening methods, which may also act as weighting elements.

In a fifth embodiment, shown in FIG. 5, the lever arm in the first embodiment and the rotating float in the fourth embodiment are combined. The spar buoy 501 and stem 502 may take any form described in the first embodiment. Pump unit 503 is placed on the top of stem 502 and lever arm 504 is connected to the drive gear of pump 503. Pump unit 505 is rigidly connected to the other end of arm 504, as described in the first embodiment, but in the fifth embodiment, the rotating float of the fourth embodiment is employed to drive pump 505. The axis of rotating float 506 is secured to the drive shaft of pump 505. The principle of operation of pumps 503 and 505 are as described in the first embodiment. A pump 505 for each side of the float axis may be used as shown in FIG. 4-A, or only one pump may be needed for the axis.

FIG. 5 illustrates the spar buoy 501 geometry comprising of multiple individual pipe sections 507 connected together. A flexible hose 508 or conduit maintains the fluidic connection of the compressed air between each pipe 507 but a shorter chain 509 is used to connect and maintain the maximum distance between two sections 507. The chains provide tensile strength when two sections 507 are being pulled apart by the waves or ocean current. Each section 507 may have weights 510 attached to facilitate a vertical orientation in the water, as shown in FIG. 5. Alternatively, only the section nearest to the sea floor may be secured with weights to maintain a vertical orientation for the whole chain of pipe sections. For the section nearest the sea floor, the anchoring methods remain the same as the first embodiment.

Wave displacements cause both the movement of the arm 504 as well as rotation of the float 506. Small waves may only have negligible motion of arm 504 but cause float 506 to sway like a pendulum and generating compressed air from pump 505. In response to a larger wave, float 506 acts to lift arm 504 for compressed air generation at pump unit 503 as well as the rotation at float 506 to drive pump unit 505. Pumps 503 and 505 as well as the floats 506 may be different have different sizes to optimize the wave energy harvest. In the example mentioned above, pump 503 may be a bigger capacity pump since it responds to larger waves.

Any of the many embodiments described in the first and fourth embodiment may be combined. In the first embodiment shown in FIG. 1-A, weights may be placed at the top of vertical lever arm 106, or at the end of an extended vertical lever arm 106 beyond the pump unit 105 such that the weight look like an inverted pendulum. Similar to the first embodiment, additional pumps may be used to capture the motions in the other axis of motion. For example, a pump may be placed on stem 502 to capture the rotational motion of pump 503 and arms 504 around the axis of the stem 502.

In a sixth embodiment, the vertical orientation of the spar buoy may be horizontal or angled relative to the surface of the sea, and may be combined with the vertical orientation. FIG. 6 shows a horizontal spar buoy 601 which is connected to multiple vertical spar buoys 602 and stems 603. The function of the spar buoy 601 remains the same, providing a large inertial mass as well as storage for the compressed air. The vertical spar buoys 602 of FIG. 6 need not be included, so that the horizontal spar buoy 601 is directly connected to stems 603. Multiple stems 603 may be connected to a single spar buoy 601 in a horizontal orientation, and multiple horizontal spar buoys may be combined to form a network of stems 603 and bodies 601.

The float and pump unit 604 combination may be any of the embodiments described above. As in the first embodiment, weights 605 may be attached to the bottom of the spar buoy 601 to maintain the buoyant stability. Auxiliary floats may be used to support the orientation of the horizontal spar buoy 601 such that stems 603 extend vertically from the spar buoy to protrude the water surface. Long flexible conduits may be used to connect the bodies 601 to a submarine pipeline 112 if used or have one long vertical spar buoy that extends to the sea depth of the submarine pipeline. A similar mooring mechanism to the first embodiment is also used.

The embodiments presented here allow for the low cost of the point absorbers placed in the sea compared to other wave energy generation methods. The spar buoy method facilitates the wave harvest mechanisms at lower cost compared to those with permanent structures. The generated energy in the form of compressed air allows for the energy to be stored. Since wave energy is inconsistent and unpredictable, the embodiments can harvest wave energy from a wide range of conditions and allow consumption at a constant rate. In these embodiments, the amount of wave energy harvested is proportional to the wave amplitude. The compressed air is used to power turbines or other known methods to generate electrical energy or to perform other useful work the turbines or other components used can be commercially available units that are more efficient and cost effective and may be placed at sea, on land, or on a sea vessel. The storage and transport of compressed air also do not pose environmental hazards if a spar buoy or pipeline is damaged or leaking. Additionally when the power grid has excess supply, on shore pumps may generate compressed air to be stored in the spar buoy, acting as an energy storage model for the power grid.

In the description above, at least one embodiment of the wave energy conversion device will provide a reliable, economical, and environmentally friendly method of harnessing wave energy. While the above description contains much specificity, these should not be construed as limitations on the scope, but rather as exemplifications of several preferred embodiment thereof. Many other variations are possible. For example, multiple pump unit embodiments and mechanisms may be combined with any of the spar buoy geometry embodiments described. While air is described here as the compressed media, alternate compressible fluids may be used. In those cases, a closed loop may be needed to return the expanded, low pressure, fluid from shore with another pipeline. Furthermore, even though the mechanism is described here for used at sea, the invention works in all bodies of water with waves.

While a presently preferred and various alternative embodiments of the present invention have been described in sufficient detail above to enable a person skilled in the relevant art to make and use the same it should be obvious that various other adaptations and modifications can be envisioned by those persons skilled in such art without departing from either the spirit of the invention or the scope of the appended claims.

What is claimed is:

1. An apparatus for harvesting wave energy by compressing a fluid comprising:
    at least one spar buoy comprising at least one hollow vessel for storing a compressed fluid,
    at least one piston pump comprising at least one compression cylinder, one piston, one piston rod and,
    at least one unidirectional valve,
    at least one float for harnessing wave energy,
    at least one gear coupled to said at least one piston pump,
    at least one pinion gear connected to said piston pump through said piston rod,
    wherein said at least one gear is a drive gear coupled to a pinion gear,
    wherein said drive gear and said pinion gear are sized such that a rotation of said drive gear results in one or more complete rotation of said pinion gear,
    wherein a full rotation of said pinion gear results in at least one full reciprocal linear motion of said piston in said piston pump, a lever arm coupled to said at least one gear and connected to said at least one float, wherein a relative motion of said at least one float to said spar buoy causes rotation of said lever arm, which in turn causes a rotational motion of said at least one drive gear, such that the rotation of said drive gear rotates said at least one pinion gear thereby resulting in a reciprocal linear motion of said at least one piston of said at least one piston pump for compressing fluid, wherein one actuation of said lever arm results in multiple reciprocal linear motions of said piston in said piston pump.

2. The apparatus of claim 1, wherein said spar buoy is weighted to achieve a preferred orientation in the water.

3. The apparatus of claim 1, wherein said spar buoy is weighted to achieve a neutral buoyancy.

4. The apparatus of claim 1, wherein said fluid comprises nitrogen.

5. The apparatus of claim 1, wherein said fluid is air.

6. The apparatus of claim 1, wherein said fluid comprises a gas.

7. The apparatus of claim 1, wherein said at least one piston pump comprises multiple pistons, compression cylinders, and piston rods.

8. The apparatus of claim 7 further comprising a crankshaft, wherein said multiple pistons are arranged at different phase angles along said crankshaft.

9. An apparatus for harvesting wave energy by compressing a gas comprising:
at least one spar buoy comprising at least one hollow vessel for storing a compressed fluid,
at least one piston pump comprising at least one compression cylinder, one piston, one piston rod and,
at least one unidirectional valve,
at least one float for harnessing wave energy,
at least one gear coupled to said at least one piston pump,
at least one pinion gear connected to said piston pump through said piston rod,
wherein said at least one gear is a drive gear coupled to a pinion gear,
wherein said drive gear and said pinion gear are sized such that a rotation of said drive gear results in one or more complete rotation of said pinion gear
wherein a full rotation of said pinion gear results in at least one full reciprocal linear motion of said piston in said piston pump,
a lever arm coupled to said at least one gear and connected to said at least one float,
wherein a relative motion of said at least one float to said spar buoy causes rotation of said lever arm, which in turn causes a rotational motion of said at least one drive gear, such that the rotation of said drive gear rotates said at least one pinion gear thereby resulting in a reciprocal linear motion of said at least one piston of said at least one piston pump for compressing gas, wherein on actuation of said lever arm results in multiple reciprocal linear motions of said piston in said poston pump.

10. The apparatus of claim 9, further comprising a pipeline hose connecting said spar buoy to a submarine pipeline for transporting said compressed fluid to shore to an electricity generating turbine.

11. The apparatus of claim 9, wherein said spar buoy is tapered along a vertical axis.

12. The apparatus of claim 9, wherein said spar buoy comprises a plurality of spar buoy pipes oriented parallel to each other.

13. The apparatus of claim 9, wherein said pinion gear is engaged to a crankshaft connected to said piston rod of said piston, wherein rotation of said drive gear causes rotation of said pinion gear, which in turn causes rotation of said crankshaft resulting in said piston rod to move up and down of said piston pump.

14. The apparatus of claim 9, wherein said at least one piston pump harvests a vertical and a lateral motion of said plurality of floats caused by said wave energy.

15. The apparatus of claim 1, wherein said piston pump compresses said fluid in a double acting cylinder, wherein compressing of said fluid is achieved in both an upward and downward stroke of said piston pump with said double acting cylinders.

16. The apparatus of claim 1, wherein said spar buoy may comprise at least one stem.

17. The apparatus of claim 1 wherein said spar buoy comprises a hollow tubular vessel that is submerged in an approximate vertical orientation at sea.

18. The apparatus of claim 17, wherein said hollow vessel is a sealed vessel for fluid storage.

19. The apparatus of claim 1 wherein said spar buoy is mobile.

20. The apparatus of claim 1, wherein said pinion gear is engaged to a crankshaft, wherein said crankshaft connected to said piston rod of said piston pump,
wherein rotation of said drive gear causes rotation of said pinion gear, which in turn causes rotation of said crankshaft resulting in said piston rod to move up and down of said piston pump.

21. The apparatus of claim 1, wherein spar buoy comprises a stem that is above a water surface.

22. The apparatus of claim 1, where said at least one piston pump harvests a vertical and a lateral motion of said plurality of floats caused by said wave energy.

* * * * *